(12) United States Patent
Oreifej

(10) Patent No.: US 12,505,344 B2
(45) Date of Patent: Dec. 23, 2025

(54) NEURAL NETWORK TRAINING BASED ON CONSISTENCY LOSS

(71) Applicant: Synaptics Incorporated, San Jose, CA (US)

(72) Inventor: Omar Oreifej, Campbell, CA (US)

(73) Assignee: Synaptics Incorporated, San Jose, CA (US)

( * ) Notice: Subject to any disclaimer, the term of this patent is extended or adjusted under 35 U.S.C. 154(b) by 1149 days.

(21) Appl. No.: 17/464,036

(22) Filed: Sep. 1, 2021

(65) Prior Publication Data

US 2023/0063209 A1    Mar. 2, 2023

(51) Int. Cl.
    *G06K 9/62*    (2022.01)
    *G06N 3/08*    (2023.01)
    *G06T 5/70*    (2024.01)

(52) U.S. Cl.
    CPC .................. *G06N 3/08* (2013.01); *G06T 5/70* (2024.01); *G06T 2207/20081* (2013.01); *G06T 2207/20084* (2013.01); *G06T 2207/20224* (2013.01)

(58) Field of Classification Search
    CPC .......... G06N 3/08; G06N 3/045; G06N 3/084; G06N 3/09; G06T 5/70; G06T 2207/20081; G06T 2207/20084; G06T 2207/20224; G06V 10/40; G06V 10/82
    See application file for complete search history.

(56) References Cited

U.S. PATENT DOCUMENTS

2018/0293712 A1* 10/2018 Vogels ................ G06F 18/2148
2019/0005629 A1*  1/2019 Sharma ................. G06T 3/4046

FOREIGN PATENT DOCUMENTS

WO    WO-2021230708 A1 * 11/2021    ............. G06T 5/002

OTHER PUBLICATIONS

Oreifej and Shah, "Robust Subspace Estimation Using Low-Rank Optimization," Theory & Applications, Springer, Dec. 31, 2013, 158 pages.

* cited by examiner

*Primary Examiner* — Xin Jia
(74) *Attorney, Agent, or Firm* — Paradice & Li LLP

(57) ABSTRACT

A system and method for denoising a sequence of images while maintaining a consistent appearance among images displayed consecutively in the sequence. A machine learning system maps a first input image in the sequence of images to a first output image based on a neural network algorithm and determines a first network loss based on differences between the first output image and a ground truth image. The system further maps a second input image in the sequence of images to a second output image based on the neural network algorithm and determines a second network loss based on differences between the second output image and the ground truth image. The system determines a consistency loss based on differences between the first output image and the second output image and updates the neural network algorithm based on the first network loss, the second network loss, and the consistency loss.

20 Claims, 8 Drawing Sheets

| | Output Image 503 | Output Image 504 | Ground Truth Image 525 |
|---|---|---|---|
| Pyramid Level 1 | P1 ~ 0.25<br>$L_1$ Loss = 0 | P1' ~ 0<br>$L_1$ Loss = 0.25 | P1'' ~ 0.25 |
| Pyramid Level 0 | P0$_1$ 0 \| P0$_2$ 0.5<br>0.5 \| 0 P0$_4$<br>P0$_3$<br>$L_0$ Loss = 1 | P0$_1$' 0 \| P0$_2$' 0<br>0 \| 0 P0$_4$'<br>P0$_3$'<br>$L_0$ Loss = 1 | P0$_1$'' 0.25 \| P0$_2$'' 0.25<br>0.25 \| 0.25 P0$_4$''<br>P0$_3$'' |

FIG. 5

NEURAL NETWORK TRAINING BASED ON CONSISTENCY LOSS

TECHNICAL FIELD

The present implementations relate generally to neural networks, and specifically to training neural networks based on consistency loss.

BACKGROUND OF RELATED ART

When an image capture device captures a sequence of images (or video) of a scene, each image may exhibit noise. When the images are processed by a machine learning model and then presented in a sequence, such as a video, the video may appear to flicker due to variations in noise. That is, objects or light in the scene may appear unsteady or irregular due to differences in noise between successive processed images.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of training neural networks. The method includes steps of obtaining a sequence of input images captured of a scene; mapping a first input image in the sequence of input images to a first output image based on a neural network algorithm; determining a first network loss based on differences between the first output image and a ground truth image; mapping a second input image in the sequence of input images to a second output image based on the neural network algorithm; determining a second network loss based on differences between the second output image and the ground truth image; determining a consistency loss based on differences between the first output image and the second output image; and updating the neural network algorithm based at least in part on the first network loss, the second network loss, and the consistency loss.

Another innovative aspect of the subject matter of this disclosure can be implemented in a machine learning system including a processing system and a memory. The memory stores instructions that, when executed by the processing system, cause the machine learning system to obtain a sequence of input images captured of a scene; map a first input image in the sequence of input images to a first output image based on a neural network algorithm; determine a first network loss based on differences between the first output image and a ground truth image; map a second input image in the sequence of input images to a second output image based on the neural network algorithm; determine a second network loss based on differences between the second output image and the ground truth image; determine a consistency loss based on differences between the first output image and the second output image; and update the neural network algorithm based at least in part on the first network loss, the second network loss, and the consistency loss.

Another innovative aspect of the subject matter of this disclosure can be implemented in a method of training neural networks. The method includes steps of obtaining a sequence of input images captured of a scene; mapping a first input image in the sequence of input images to a first output image based on a neural network algorithm; determining a first network loss based on differences between the first output image and a first ground truth image; mapping a second input image in the sequence of input images to a second output image based on the neural network algorithm; determining a second network loss based on differences between the second output image and the second ground truth image; determining a consistency loss based on differences between the first output image and the second output image; and updating the neural network algorithm based at least in part on the first network loss, the second network loss, and the consistency loss.

BRIEF DESCRIPTION OF THE DRAWINGS

The present embodiments are illustrated by way of example and are not intended to be limited by the figures of the accompanying drawings.

FIG. 5 shows an illustrative chart depicting example pyramid levels associated with a pyramid loss.

DETAILED DESCRIPTION

Figure 1:
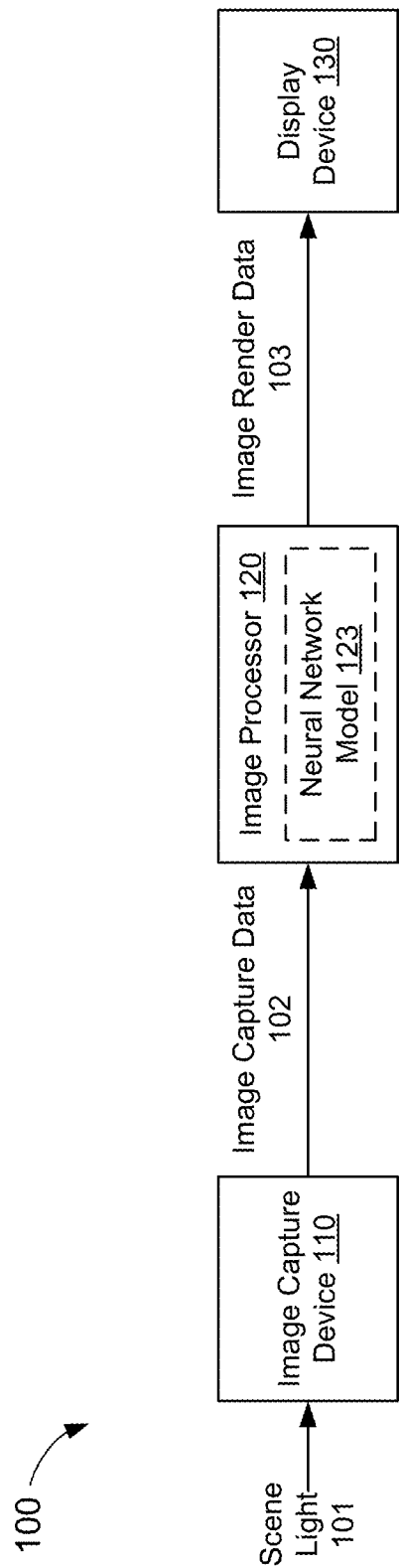
FIG. 1 shows a block diagram of an example image capture and display system that may employ a neural network model, according to some implementations.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, perform one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

Aspects of the disclosure provide systems and methods for denoising images while reducing flicker among images displayed in sequence (e.g., as video). In some embodiments, a neural network (e.g., a recurrent neural network) may be trained to infer denoised representations of a sequence (also referred to as a "batch") of images of a scene. More specifically, the neural network (also referred to as a "neural network algorithm" or "neural network model") may be trained to reduce noise in each image while maintaining a consistent appearance among images that are displayed consecutively in the sequence.

During training, a machine learning system may obtain a sequence of input images captured of a scene. The machine learning system may also obtain one or more ground truth images, which are reference images of the scene that may contain little or no noise. In some embodiments, a ground truth image may be any image that has a higher signal-to-noise ratio (SNR) than any of the input images in the sequence. In some other embodiments, a ground truth image may be any image that has a higher resolution (e.g., pixel resolution) than any of the input images in the sequence. Further, in some embodiments, the machine learning system may map a first input image in the sequence of input images to a first output image based on a neural network algorithm. The machine learning system may also determine a first network loss based on differences between the first output image and a ground truth image. The machine learning system may further map a second input image in the sequence of input images to a second output image based on the neural network algorithm; and determine a second network loss based on differences between the second output image and the ground truth image. Each of the first and second network losses may represent differences between the first and second output images, respectively, and the ground truth image. For example, such differences may reflect an amount of error or noise in each output image. The machine learning system may further determine a consistency loss based on differences between the first and second output images. As such, the consistency loss may represent differences between the first and second output images. For example, such differences may reflect an amount of variation in noise or appearance across successive or consecutive images in a sequence.

In some embodiments, the machine learning system may update the neural network algorithm based at least in part on the first and second network losses and the consistency loss, for example, at the end of each iteration of the training process. In some aspects, the machine learning system may repeat the training process until certain convergence criteria are met. In some embodiments, the trained neural network model may be deployed in, for example, an image capture and display system, and used to infer, in real time, denoised representations of images. By training the neural network based on consistency loss, the neural network model may minimize the variation of noise in images displayed in sequence. Accordingly, when the denoised images are displayed in sequence, such as in a video, the video appears smooth and consistent, with minimal or no flickering.

FIG. 1 shows a block diagram of an example image capture and display system 100 that may employ a neural network model, according to some implementations. The system 100 includes an image capture device 110, an image processor 120, and a display device 130. The image capture device 110 (e.g., a camera) captures a sequence of patterns of light 101 from a scene (also referred to as "scene light 101") and converts the scene light 101 to digital image capture data 102 (also referred to as "image capture data 102"). The image capture data 102 may include, for each pattern of light in the sequence, an array of pixels (or pixel values) representing a digital image of the scene. The display device 130 (such as a television, computer monitor, smartphone, or any other device that includes an electronic display) renders or displays the digital images by reproducing the sequence of light patterns on an associated display surface.

The image processor 120 converts the image capture data 102 to image render data 103 that, when displayed on the display device 130, may reflect the original scene captured by the image capture device 110 as a video with little or no flicker. For example, the image processor 120 may be configured to correct and smooth various pixel distortions associated with the image capture data 102. In other words, the image processor 120 may be configured to reduce and minimize the variation of noise associated with the digital images. Although depicted as an independent block in FIG. 1, in actual implementations, the image processor 120 may be incorporated or otherwise included in the image capture device 110, the display device 130, or a combination thereof.

In some embodiments, the image processor 120 may create denoised representations of the image capture data 102 (e.g., the image render data 103) based on a neural network model 123 that is trained through machine learning. Machine learning is a technique for improving the ability of a computer system or application to perform a certain task. During a training phase, a machine learning system may be provided with multiple "answers" and one or more sets of raw data to be mapped to each answer. For example, the machine learning system may be trained to perform denoising operations on a sequence of low-light images by providing the system with a sequence of short-exposure images captured of a scene in low-light conditions (which represents the raw data) and one or more representative (or ground truth) images of the same scene that contain little or no noise (which represents the answer). The machine learning system may then analyze the raw data to "learn" a set of rules that can be used to reproduce the answers. For example, the machine learning system may perform statistical analysis on the raw data to determine a common set of features (also referred to as "rules") related to noise or variations in noise associated with the raw data.

In some aspects, the machine learning system may employ deep learning, which is a particular form of machine learning in which the model being trained is a multi-layer neural network. Deep learning architectures are often referred to as artificial neural networks due to the way in which information is processed (similar to a biological nervous system). For example, each layer of the deep learning architecture may be composed of a number of artificial neurons. The neurons may be interconnected across the various layers so that input data (or the raw data) may be passed from one layer to another. More specifically, each layer of neurons may perform a different type of transformation on the input data that will ultimately result in a desired output. The interconnected framework of neurons may be referred to as a neural network model. Thus, the neural network model 123 may include a set of rules that can be used to "infer" denoised representations of the image capture data 102. As such, the image processor 120 may use the neural network model 123 to reduce and minimize the variation of noise associated with the image capture data 102.

Figure 2:
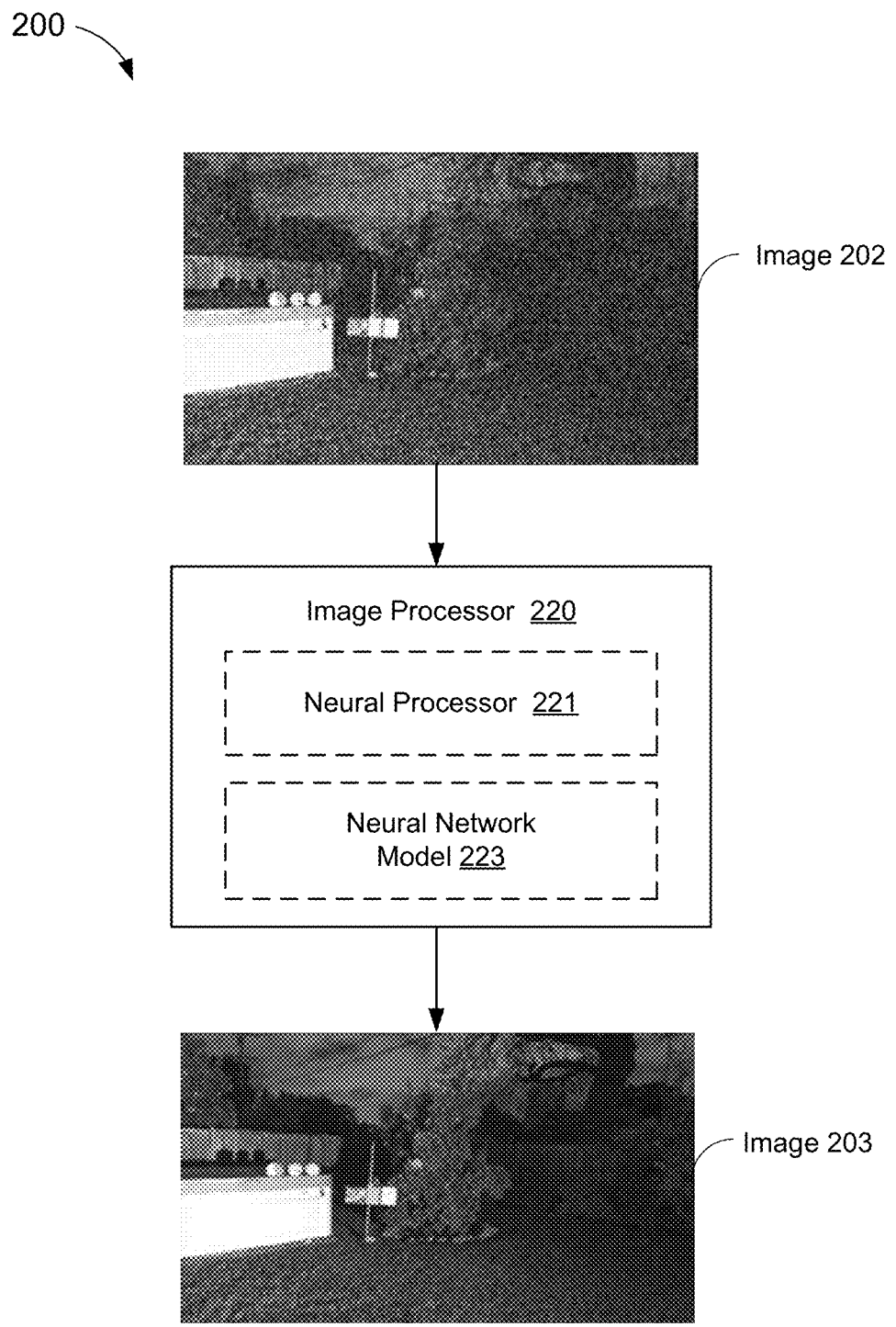
FIG. 2 shows a block diagram of an example operation of an image processor employing a neural network model, according to some implementations.

FIG. 2 shows a block diagram of an example operation 200 of an image processor employing a neural network model, according to some implementations. The image processor 220 may be an embodiment of the image processor 120 of FIG. 1. Thus, the image processor 220 may be configured to receive image 202 and output a denoised image 203. With reference to FIG. 1, the image 202 may be one example of the image capture data 102 and the denoised image 203 may be one example of the image render data 103.

In some embodiments, the image processor 220 may include a neural processor 221 and a neural network model 223. The neural processor 221 may include one or more processors that are configured to accelerate neural network inferencing. For example, the hardware architecture of the neural processor 221 may be designed to traverse neural networks more quickly or efficiently than a general-purpose processor. The neural processor 221 may implement a neural network based on the neural network model 223. In some embodiments, the neural network model 223 may be one example of the neural network model 123 of FIG. 1. Thus, the neural network model 223 may include a set of rules that can be used to infer denoised representations of captured images.

As shown in FIG. 2, the image 202 appears noisy or grainy. For example, the distribution of pixels in the image 202 contains "spikes" in brightness and color (such as dark pixels in bright regions of the scene and bright pixels in dark regions of the scene). In contrast, the color and brightness of pixels in the denoised image 203 follow a substantially smooth distribution. For example, the dark regions of the scene appear dark and the bright regions of the scene appear bright in denoised image 203. While FIG. 2 shows only a single noisy image 202 that is processed by the image processor 220, in actual implementations, a sequence of noisy images (or video) may be processed by the image processor 220. Further, the image processor 220 may use the neural processor 221 and neural network model 223 to output a sequence of denoised images that, when displayed on a display screen, appear as a smooth or stable video.

To produce the sequence of denoised images, the neural network model 223 may be trained prior to being integrated in the image processor 220. More specifically, the neural network model 223 may be trained by a machine learning system to infer denoised representations of a sequence of noisy input images captured of a scene. In some embodiments, the training may include mapping a first input image in a sequence of input images to a first output image using a neural network algorithm, and determining a first network loss based on differences between the first output image and a ground truth image. The first network loss may represent an amount of noise in the first output image relative to the ground truth image. In some embodiments, the training may further include mapping a second input image in the sequence of input images to a second output image using the neural network algorithm, and determining a second network loss based on differences between the second output image and the ground truth image. The second network loss may represent an amount of noise in the second output image relative to the ground truth image.

In some embodiments, the first output image may be compared to the second output image to determine a consistency loss, which may represent differences between the first and second output images. For example, such differences may reflect an amount of variation in noise or appearance across the first and second output images. In some embodiments, the first and second network losses and the consistency loss may be used to update the weights of the neural network algorithm. Further, in some embodiments, the machine learning system may repeat the training process described above until certain convergence criteria are met.

By updating the neural network algorithm based on the first and second network losses, the neural network algorithm may be configured to reduce noise in a sequence of output images. Further, by updating the neural network algorithm based on the consistency loss, the neural network algorithm may be configured to reduce the amount of variation in noise among the sequence of output images so that when the output images are displayed as a video, they may appear as a smooth or stable video, with little or no flickering.

Figure 3:
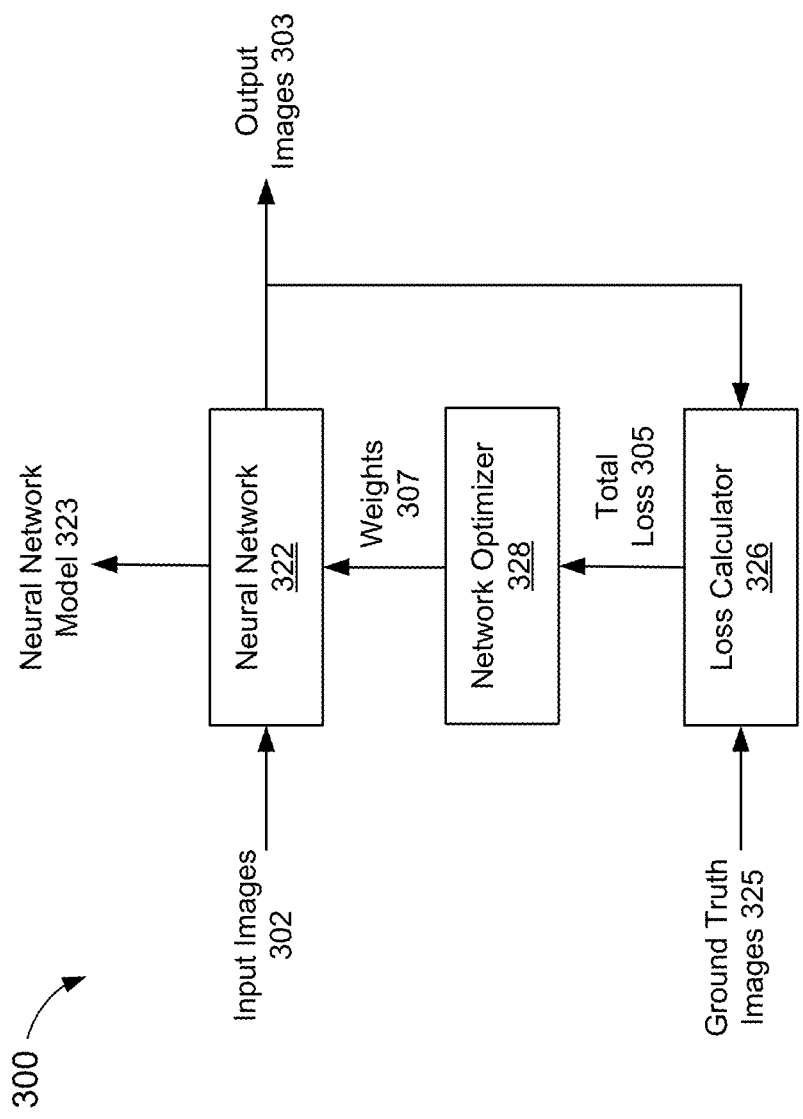
FIG. 3 shows a block diagram of an example machine learning system, according to some implementations.

FIG. 3 shows a block diagram of an example machine learning system 300, according to some implementations. The machine learning system 300 includes a neural network 322, a loss calculator 326, and a network optimizer 328. In some aspects, the machine learning system 300 may be used to train the neural network 322 to produce a neural network model 323. The neural network model 323 may be an embodiment of the neural network model 123 and/or 223 of FIGS. 1 and 2, respectively.

As shown in FIG. 3, the machine learning system 300 may obtain a sequence of input images 302 (also referred to as "input images 302") and one or more ground truth images 325. In some embodiments, the SNR of each input image 302 may be less than the SNR of the one or more ground truth images 325. For example, in some embodiments, each of the input images 302 may represent a noisy, short-exposure image of a scene in low-light conditions, and each of the one or more ground truth images 325 may represent a long-exposure image of the scene in the low-light conditions, with little or no noise. Further, in some embodiments, the resolution (e.g., pixel resolution) of each input image 302 may be less than the resolution of the one or more ground truth images 325. In such embodiments, the machine learning system 300 may use the one or more ground truth images 325 to upscale each of the input images 302 (or perform super resolution).

In some embodiments, each of the input images 302 and each of the one or more ground truth images 325 may have a respective brightness level. For example, the brightness level of an image may reflect the illumination (or illuminance) of a scene depicted in the image, the exposure of the image, and/or the gain (or sensitivity) of photosensors of an image capture device used to capture the image. In some embodiments, each of the input images 302 may be preprocessed such that the brightness level of each input image 302 may be equal to the brightness level of the ground truth image 325.

As shown in FIG. 3, the neural network 322 may be configured to receive each input image 302 and produce a respective output image 303 based on the received input image 302. More specifically, the neural network 322 may produce denoised representations of the input images 302 by attempting to recreate the one or more ground truth images 325. In some embodiments, the neural network 322 may be a recurrent neural network configured to learn the temporal dynamics of noise in the sequence of input images 302. In some aspects, the neural network 322 may form a network of weighted connections across multiple layers of artificial neurons that begin with the sequence of input images 302 and lead to the denoised sequence of output images 303. In some embodiments, the neural network 322 may be configured to provide each image in the denoised sequence of output images 303 to the loss calculator 326.

As shown in FIG. 3, the loss calculator 326 may be configured to receive the denoised sequence of output images 303 from the neural network 322. The loss calculator 326 may also be configured to receive the one or more ground truth images 325. In some aspects, the loss calculator 326 may be configured to determine an amount of network loss (or error or noise) in each image in the sequence of output images 303 relative to the one or more ground truth images 325. For example, to determine a first network loss, the loss calculator 326 may compare a first output image 303 to a ground truth image 325; and to determine a second network loss, the loss calculator 326 may compare a second output image 303 to a ground truth image 325. The loss calculator 326 may also be configured to determine additional network losses by comparing each of any remaining output images in the sequence of output images 303 to a ground truth image 325.

In some aspects, the loss calculator 326 may also be configured to determine a consistency loss (or amount of variation in noise) among the sequence of output images 303. For example, to determine the consistency loss, the loss calculator 326 may compare the first output image 303 to the second output image 303, where the first output image 303 and the second output image 303 are successive images in the sequence of output images 303. In some embodiments, the loss calculator 326 may be further configured to determine the consistency loss based on any remaining successive images in the sequence of output images 303. In some aspects, the loss calculator 326 may be configured to combine the consistency loss, first network loss, second network loss, and any additional network losses, to determine a total loss 305. The loss calculator 326 may be further configured to output the total loss 305 to the network optimizer 328.

In some aspects, the network optimizer 328 may be configured to receive the total loss 305 and adjust one or more weights (also referred to as "parameters") 307 of the neural network 322 based on the total loss 305. More specifically, the network optimizer 328 may adjust the weights 307 in a manner that reduces the total loss 305. The machine learning system 300 may repeat the training process described above over one or more iterations until certain convergence criteria are met. For example, a new sequence of noisy images may be provided as inputs to the neural network 322, the loss calculator 326 may determine a total loss 305 based on outputs of the neural network 322, and the network optimizer 328 may further update the weights 307 based on the total loss 305.

Figure 4:
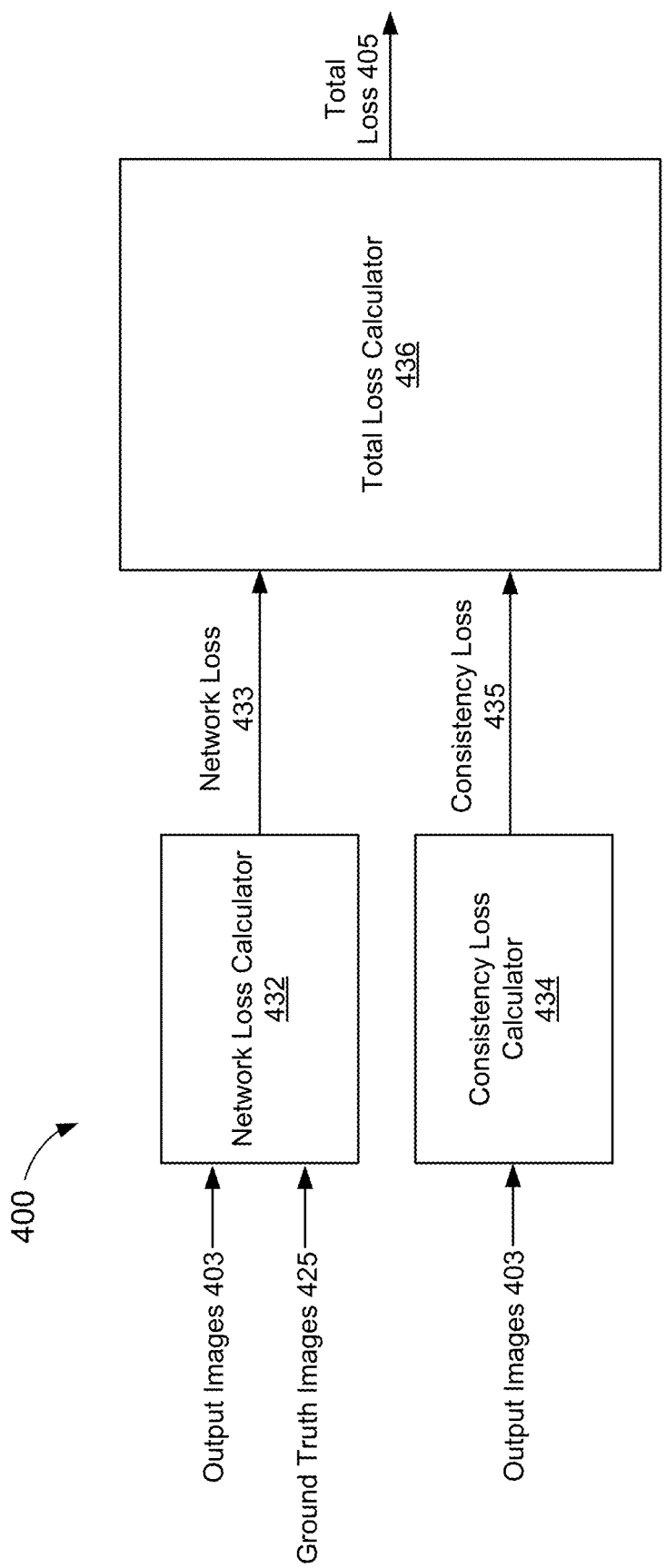
FIG. 4 shows a block diagram of an example loss calculator, according to some implementations.

FIG. 4 shows a block diagram of an example loss calculator 400, according to some implementations. The loss calculator 400 may be an embodiment of the loss calculator 326 of FIG. 3. As shown in FIG. 4, the loss calculator 400 includes a network loss calculator 432, a consistency loss calculator 434, and a total loss calculator 436.

The network loss calculator 432 may be configured to receive each image in a sequence of output images 403 (also referred to as "output images 403") from a neural network, such as the neural network 322 of FIG. 3. The network loss calculator 432 may also be configured to receive one or more ground truth images 425.

In some aspects, the sequence of output images 403 may be characterized by the following four dimensions: (i) batch size N; (ii) height H; (iii) width W; and (iv) channel C. The batch size N may represent the total number of images in the sequence of output images 403. The height H may represent the height, in pixels, of each image in the sequence of output images 403. The width W may represent the width, in pixels, of each image in the sequence of output images 403. The channel C may represent the color of each pixel (e.g., red, green, blue, and/or opacity), or value of each pixel, in each image in the sequence of output images 403. In some embodiments, the channel C may be represented by one or more numerical values. It is noted that, like the sequence of output images 403, the one or more ground truth images 425 and a sequence of input images (e.g., the sequence of input images 302 of FIG. 3) may be characterized by the four dimensions N, H, W, and C.

In some aspects, the network loss calculator 432 may be configured to determine a total network loss 433 (also referred to as "network loss 433"), which may represent an amount of error or noise in the sequence of output images 403 relative to the one or more ground truth images 425. The network loss calculator 432 may determine the network loss 433 based on differences between the pixel values of each image in the sequence of output images 403 and the pixel values of the one or more ground truth images 425. For example, in some embodiments, the network loss calculator 432 may be configured to determine a first network loss by comparing the pixel values of a first output image 403 to the pixel values of a ground truth image 425. The network loss calculator 432 may also be configured to determine a second network loss by comparing the pixel values of a second output image 403 to the pixel values of a ground truth image 425. Where the first and second output images 403 represent each image in the sequence of output images 403, the network loss calculator 432 may combine the first and second network losses to generate the total network loss 433.

In some embodiments, the network loss calculator 432 may be configured to determine the network loss 433 based on one or more pyramid losses. A pyramid loss may represent a total amount of error in pixel values of an output image 403 relative to pixel values of a ground truth image 425 at various pyramid levels (or scales). A pyramid level (or scale) may refer to a pixel granularity of an image, such as an output image 403 or ground truth image 425. For example, higher pyramid levels may be associated with coarser pixel granularities, or fewer pixel values. As such, the image may appear "zoomed out" (and thus exhibit less detail) compared to the same image at a lower pyramid level. In some embodiments, the network loss 433 may include the pyramid loss for at least one output image 403. Further, in some embodiments, the network loss 433 may include the pyramid loss for each image in the sequence of output images 403.

The consistency loss calculator 434, like the network loss calculator 432, may be configured to receive each image in the sequence of output images 403. In some aspects, the consistency loss calculator 434 may be configured to determine a consistency loss 435, which may represent an amount of variation in noise between two or more successive images in the sequence of output images 403. Put differently, the consistency loss 435 may represent an amount or degree of inconsistency among two or more successive images in the sequence of output images 403. In some aspects, the consistency loss 435 may be based on a standard deviation, and may be expressed as follows:

$$\text{Consistency Loss} = \sum_{n=0}^{N}\sum_{h=0}^{H}\sum_{w=0}^{W}\sum_{c=0}^{C}(p_{cwhn}-m_{cwh})^2 \quad \text{(Equation 1A)}$$

In Equation 1A, N, H, W, and C represent four dimensions of the sequence of output images 403, and n, h, w, and c are indices that correspond to the dimensions, N, H, W, and C, respectively. $p_{cwhn}$ represents the pixel value at channel c, width w, height h, and batch index (also referred to as "image index") n. $m_{cwh}$ represents the mean (or average) value of the pixels located at channel c, width w and height h, calculated across the batch dimension (e.g., from image index n=0 to n=N). Further, $m_{cwh}$ may be expressed as follows:

$$m_{cwh} = \frac{\sum_{n=0}^{N} p_{cwhn}}{N} \quad \text{(Equation 1B)}$$

It is noted that Equations 1A and 1B above may be suitable for use when the batch size N of a sequence of output images 403 (or a corresponding sequence of input images) remains constant as a machine learning system (e.g., the machine learning system 300 of FIG. 3) undergoes multiple iterations of a training process.

In some other embodiments, the consistency loss 435 may represent the rank of a matrix (B) (also referred to as "matrix B") based on the sequence of output images 403. More specifically, the matrix B may include a series of vectors, where each vector corresponds to an image in the sequence of output images 403. Further, each vector may be flattened or reduced to a single dimension that represents each of the dimensions H, W, and C, for a given image in the sequence of output images 403. In some aspects, the matrix B may be expressed as follows:

Matrix B=[vec(output image$_1$),vec(output image$_2$), . . . ,vec(output image$_N$)]

The matrix B has two dimensions, with one dimension including H, W, and C, and the other dimension including N. Aspects of the present disclosure recognize that the rank of matrix B may represent the maximum number of linearly independent output images 403 in matrix B, and the higher the rank of matrix B, the greater the amount of inconsistency (or variation in noise) there is among the sequence of output images 403.

While the consistency loss 435 may be based on the matrix B or a mean pixel value (as shown in Equations 1A and 1B above), in some embodiments, the consistency loss 435 may be based on certain relationships among the images in the sequence of output images 403. For example, in some embodiments, the sequence of output images 403 may depict a dynamic scene, such as a scene depicting an object in motion. A first image in the sequence of output images 403 may include one or more pixels that correspond to a first location of the object in the scene, and a second image in the sequence of output images 403 may include one or more pixels that correspond to a second location of the object in the scene. In some aspects, the movement of the object may be defined based on the one or more pixels corresponding to the location of the object in the first image, and the one or more pixels corresponding to the location of the object in the second image. Once the movement is defined, the first and/or second images in the sequence of output images 403 may be modified or warped, and the consistency loss 435 may be determined based on the defined movement and/or the modified first and second images. While a relationship based on motion (or a defined movement) has been described above, in some embodiments, the relationship may be based on changes in pixel values (e.g., pixel intensity) among the sequence of output images 403.

As shown in FIG. 4, the network loss 433 and the consistency loss 435 are provided to the total loss calculator 436. The total loss calculator 436 may be configured to combine the network loss 433 and consistency loss 435 to determine a total loss 405, which may be expressed as follows:

$$\text{Total Loss} = \alpha * \text{Network Loss} + (1-\alpha) * y * \text{Consistency Loss} \quad \text{(Equation 2)}$$

In Equation 2, $\alpha$ is a scalar quantity used to balance the network loss 433 and the consistency loss 435, and y may be set to a value of 0 or 1, depending on the content of the sequence of output images 403. In some embodiments, a sequence of input images (such as the sequence of input images 302 of FIG. 3) may be labelled (or classified) as depicting a static scene, dynamic scene, or both static and dynamic scenes. The labeling may be performed by any suitable manual or automatic method. Further, the labeling may be transferred from the sequence of input images to a corresponding sequence of output images (e.g., the sequence of output images 303 and/or 403 of FIGS. 3 and 4, respectively) during a training operation.

In some embodiments, where the sequence of output images 403 depicts a static scene, y may be set to 1. In some other embodiments, where the sequence of output images 403 depicts a dynamic scene, y may be set to 0. Further, in some other embodiments, where the sequence of output images 403 depicts both static and dynamic scenes, y may be a vector of size N (the batch size of the sequence of output images 403). That is, y may be a vector of N components, where each component corresponds to a respective image in the sequence of output images 403. Further, a component may be set to 1 if the component corresponds to an output image 403 that is part of a static scene, and the component may be set to 0 if the component corresponds to an output image 403 that is part of a dynamic scene.

Once the total loss 405 is determined, a network optimizer (such as the network optimizer 328 of FIG. 3) may use the total loss 405 to determine whether certain convergence criteria are met. For example, where the total loss 405 falls below a threshold level, and/or where a predetermined number of training iterations has been completed, the network optimizer may determine that a neural network (such as the neural network 322 of FIG. 3) is optimized. Accordingly, the network optimizer may not update the weights (such as the weights 307 of FIG. 3) of the neural network. As another example, where the total loss 405 is above a threshold level, and/or where a predetermined number of training iterations has not yet been completed, the network optimizer may determine that the neural network is not yet optimized. Thus, the network optimizer may determine one or more weights that minimize the total loss 405 in order to update the weights of the neural network.

In some aspects, the network optimizer may use a stochastic gradient descent method to minimize the total loss 405 and determine the one or more weights. In addition to the stochastic gradient descent method, the network optimizer may use additional techniques to minimize the consistency loss component of the total loss 405. For example, where the consistency loss 435 is calculated using Equations 1A and 1B above, Tensorflow or Keras software libraries may be used to minimize the consistency loss 435. As another example, where the consistency loss 435 is represented by the rank of matrix B, the rank (which is non-convex) may be minimized by replacing the rank with its non-convex surrogate, the nuclear norm, and using L1-norm sparse decomposition and the Augmented Lagrange Multiplier (ALM) method.

FIG. 5 shows an illustrative chart 500 depicting example pyramid levels (or scales) associated with a pyramid loss. In some aspects, a pyramid loss may represent differences between an output image (e.g., output image 503 or 504 of FIG. 5) and a ground truth image (e.g., ground truth image 525 of FIG. 5) at different pyramid levels (e.g., pyramid levels 0 and 1 of FIG. 5). In some embodiments, a pyramid loss may be determined by a network loss calculator (e.g., the network loss calculator 432 of FIG. 4).

A pyramid level (or scale) may refer to a pixel granularity of an image, such as an output image or ground truth image. For example, higher pyramid levels may be associated with coarser pixel granularities, or fewer pixel values. As such, the image may appear zoomed out (or exhibit less detail) than the same image at a lower pyramid level. For example, each pixel value associated with a higher pyramid level may represent an average of two or more pixel values (e.g., of two or more adjacent pixels) associated with a lower pyramid level. In contrast, lower pyramid levels may be associated with finer pixel granularities, or more pixel values. As such, the image may appear zoomed in (or exhibit more detail) than the same image at a higher pyramid level. For example, the pixel values associated with the lowest pyramid level (e.g., pyramid level 0 in FIG. 5) may represent the raw (or unscaled) pixel values of an output image or ground truth image.

In some embodiments, a network loss calculator may be configured to use pooling (also referred to as "downsampling"), such as average pooling (as described above), max-pooling, or min-pooling, to produce a scaled number of pixel values associated with each pyramid level except for the lowest pyramid level. For example, the network loss calculator may pool the pixel values associated with the lowest pyramid level (e.g., pyramid level 0 of FIG. 5) to produce scaled pixel values associated with the next-lowest pyramid level (e.g., pyramid level 1 of FIG. 5). In some embodiments, the network loss calculator may be configured to calculate a pyramid loss for an image based on a predetermined pooling size, where the pooling size includes two or more pixels. For example, with reference to FIG. 5, the network loss calculator may calculate a pyramid loss for output image 503 based on a predetermined pooling size of four pixel values. That is, the network loss calculator may pool four pixel values associated with pyramid level 0 for output image 503 to produce a scaled pixel value associated with pyramid level 1 for output image 503. Further, in some embodiments, the network loss calculator may be configured to calculate a pyramid loss for an image based on a predetermined number of pyramid levels (e.g., two pyramid levels, such as pyramid levels 0 and 1 shown in FIG. 5). Further, in some embodiments, the network loss calculator may be configured to calculate a pyramid loss for an image based at least in part on a predetermined (or target) number of pixel values for the highest pyramid level. For example, with reference to FIG. 5, the network loss calculator may calculate a pyramid loss for output image 503 based at least in part on a single pixel value associated with pyramid level 1 for output image 503.

As shown in FIG. 5, pyramid level 0 and pyramid level 1, may be used to determine the pyramid loss for each of output images 503 and 504. As described above, pyramid level 0 is the lowest pyramid level shown in FIG. 5. Accordingly, pyramid level 0 is associated with pixel values that represent the raw (or unscaled) pixel values of respective pixels of output image 503, output image 504, and ground truth image 525. Put differently, FIG. 5 depicts a subset of four pixels for each of output image 503, output image 504, and ground truth image 525, at pyramid level 0. That is, at pyramid level 0, FIG. 5 shows pixels (or pixel values) $P0_1$, $P0_2$, $P0_3$, and $P0_4$ for output image 503; pixels (or pixel values) $P0_1'$, $P0_2'$, $P0_3'$, and $P0_4'$ for output image 504; and pixels (or pixel values) $P0_1''$, $P0_2''$, $P0_3''$, and $P0_4''$ for ground truth image 525. While not shown in FIG. 5, in some embodiments, a subset of two pixel values, three pixel values, or five pixel values or more, may represent the raw pixel values of respective pixels of output image 503, output image 504, and ground truth image 525, at pyramid level 0.

To determine a pyramid loss for output image 503, a network loss calculator may first calculate an amount of loss associated with pyramid level 0 (also referred to as "$L_0$ loss") for output image 503 and an amount of loss associated with pyramid level 1 (also referred to "$L_1$ loss") for output image 503. To calculate the $L_0$ loss for output image 503, the network loss calculator may sum the absolute values of the differences between corresponding pixel values for the output image 503 and ground truth image 525 at pyramid level 0, as shown in Equation 3 below:

$L_0$Loss=|$P0_1$–$P0_1''$|+|$P0_2$–$P0_2''$|+|$P0_3$–$P0_3''$|+|$P0_4$–$P0_4''$| (Equation 3)

As shown in FIG. 5, the pixels for output image 503 at pyramid level 0 have the following pixel values: $P0_1$=0, $P0_2$=0.5, $P0_3$=0.5, and $P0_4$=0. Further, each of the pixels for ground truth image 525, $P0_1''$, $P0_2''$, $P0_3''$, and $P0_4''$, has a pixel value of 0.25. When the pixel values for output image 503 and ground truth image 525 at pyramid level 0 are substituted into Equation 3, an $L_0$ loss of 1 is obtained, as shown below:

$L_0$Loss=|0–0.25|+|0.5–0.25|+|0.5–0.25|+|0–0.25|=1

Before the $L_1$ loss for output image 503 can be calculated, the network loss calculator may use pooling to generate the pixel values at pyramid level 1 for output image 503 and ground truth image 525. For example, as shown in FIG. 5, the network loss calculator may employ average pooling by averaging the pixel values for output image 503, at pyramid level 0, across four adjacent pixels (e.g., $P0_1$, $P0_2$, $P0_3$, and $P0_4$), to generate a respective pixel value, P1, for the output image 503 at pyramid level 1. The value of P1 can be calculated as shown below:

$$P1 = \frac{P0_1 + P0_2 + P0_3 + P0_4}{4} = \frac{0 + 0.5 + 0.5 + 0}{4} = 0.25$$

Similarly, the network loss calculator may use average pooling to average the pixel values for ground truth image 525 at pyramid level 0 to determine a respective pixel value, P1", for the ground truth image 525 at pyramid level 1. The value of P1" can be calculated as shown below:

$$P1'' = \frac{P0_1'' + P0_2'' + P0_3'' + P0_4''}{4} = \frac{0.25 + 0.25 + 0.25 + 0.25}{4} = 0.25$$

To calculate the $L_1$ loss for output image 503, the network loss calculator may determine the absolute value of the difference between the pixel P1 for the output image 503 and the pixel P1" for the ground truth image 525, at pyramid level 1, as shown in Equation 4 below:

$L_1$Loss=|P1–P1"| (Equation 4)

When the pixel values for output image 503 and ground truth image 525 at pyramid level 1 are substituted into Equation 4, an $L_1$ loss of 0 is obtained, as shown below:

$L_1$Loss=|P1–P1"|=|0.25–0.25|=0

More generally, the network loss calculator may determine the pyramid loss over any number (i) of pyramid levels for an output image having any number (N') of pixels using Equation 5A below:

$$\text{Pyramid Loss (output image)} = \sum_i \frac{|Pool_i(\text{output image}) - Pool_i(\text{ground truth image})|}{N_i'} \quad \text{(Equation 5A)}$$

In Equation 5A, $Pool_i$ (image x) represents a pooling or downsampling of image x (e.g., an output image or ground truth image) by the scaling factor i. An amount of loss associated with the $i^{th}$ pyramid level may be expressed as follows:

$L_i$=|$Pool_i$(output image)–$Pool_i$(ground truth image)|

When the expression above for $L_i$ is substituted into Equation 5A, the following alternative expression for pyramid loss is obtained:

$$\text{Pyramid Loss (output image)} = \frac{L_0}{N_0'} + \frac{L_1}{N_1'} + \ldots + \frac{L_{z-1}}{N_{z-1}'} \quad \text{(Equation 5B)}$$

In Equation 5B, (z) represents the total number of pyramid levels, and i is expressed as integer values ranging from 0 to z–1 (e.g., 0≤i≤z–1). When the amount of loss and number of pixels associated with pyramid levels 0 and 1 for output image 503 are substituted into Equation 5B, a pyramid loss of 0.25 is obtained, as shown below:

$$\text{Pyramid Loss (output image 503}A) = \frac{L_0}{N_0'} + \frac{L_1}{N_1'} = \frac{1}{4} + \frac{0}{1} = 0.25$$

Using the processes described above, a pyramid loss of 0.5 may be calculated for output image 504. In some embodiments, different weights may be applied to the amounts of loss (also referred to as "loss terms"), $L_0$, $L_1$, ..., $L_{z-1}$, associated with different pyramid levels when calculating the pyramid loss. For example, in some applications, the loss terms associated with lower pyramid levels may be weighted more heavily than the loss terms associated with higher pyramid levels. In some other applications, the loss terms associated with higher pyramid levels may be weighted more heavily than the loss terms associated with lower pyramid levels. Further, in some embodiments, the pyramid loss for one or more output images in a sequence of output images may be used to update the weights of a neural network algorithm.

Figure 6:
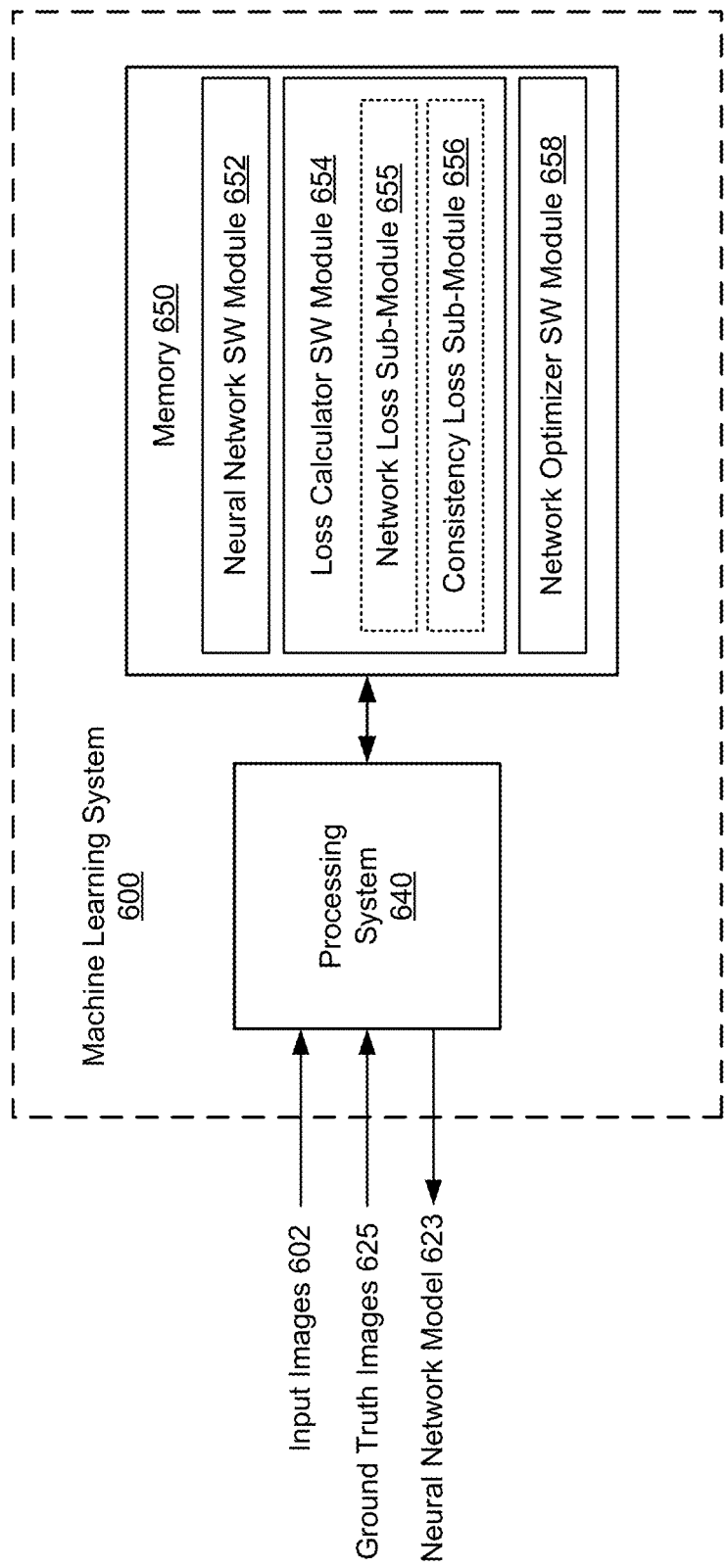
FIG. 6 shows an example machine learning system, according to some implementations.

FIG. 6 shows an example machine learning system 600, according to some implementations. In some embodiments, the machine learning system 600 may be one example of the machine learning system 300 of FIG. 3. Thus, the machine learning system 600 may be configured to produce a neural network model 623 based on a sequence of input images 602 (also referred to as input images 602) and one or more ground truth images 625. In some embodiments, the machine learning system 600 may include a processing system 640 and a memory 650.

The memory 650 may include a non-transitory computer-readable medium (including one or more nonvolatile memory elements, such as EPROM, EEPROM, Flash memory, a hard drive, and the like) that may store at least the following software (SW) modules:
- a neural network SW module 652 configured to create denoised representations of the sequence of input images 602 (e.g., a sequence of output images) by attempting to recreate the one or more ground truth images 625, to train the neural network model 623;
- a loss calculator SW module 654 configured to determine a total amount of loss based on the sequence of output images and the one or more ground truth images 625, the loss calculator SW module 654 further including:
  - a network loss sub-module 655 to determine a total amount of network loss based on the sequence of output images and the one or more ground truth images 625; and
  - a consistency loss sub-module 656 to determine an amount of consistency loss based on the sequence of output images; and
- a network optimizer SW module 658 configured to determine one or more updated weights of the neural network SW module 652 based on the total amount of loss.

Each software module includes instructions that, when executed by the processing system 640, cause the machine learning system 600 to perform the corresponding functions.

The processing system 640 may include any suitable one or more processors capable of executing scripts or instructions of one or more software programs stored in the machine learning system 600 (such as in memory 650). For example, the processing system 640 may execute the neural network SW module 652 to create denoised representations of the sequence of input images 602 by attempting to recreate the one or more ground truth images 625. In other words, the processing system 640 may execute the neural network SW module 652 to map the sequence of input images 602 to a sequence of output images.

The processing system 640 may further execute the loss calculator SW module 654 to determine a total loss. In executing the loss calculator SW module 654, the processing system 640 may further execute the network loss sub-module 655 and the consistency loss sub-module 656. For example, the processing system 640 may execute the network loss sub-module 655 to determine a total amount of network loss (or noise) in the sequence of output images relative to the one or more ground truth images 625. Further, the processing system 640 may execute the consistency loss sub-module 656 to determine the amount of variation in noise among the sequence of output images. In some embodiments, the processing system 640 may further execute the network optimizer SW module 658 to determine updated weights of the neural network SW module 652 based on the total loss.

Figure 7:
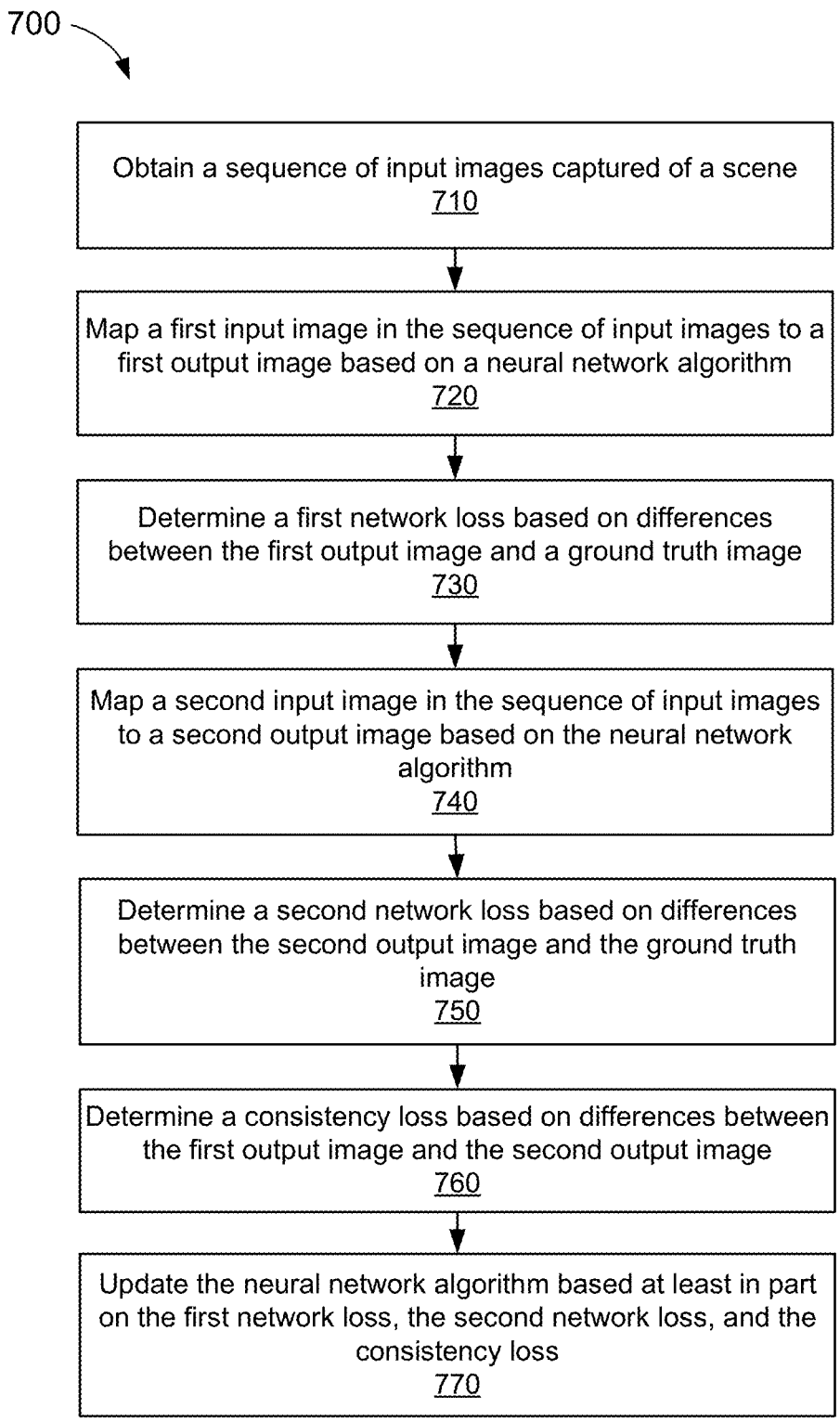
FIG. 7 shows an illustrative flowchart depicting an example operation for training neural networks, according to some implementations.

FIG. 7 shows an illustrative flowchart depicting an example operation 700 for training neural networks, according to some implementations. The example operation 700 may be performed by a machine learning system (such as the machine learning system 300 and/or 600 of FIGS. 3 and 6, respectively) to train a neural network to infer denoised representations of a sequence of input images.

The machine learning system may obtain a sequence of input images captured of a scene (710). The machine learning system may also map a first input image in the sequence of input images to a first output image based on a neural network algorithm (720). In some embodiments, the sequence of input images may represent images of a static scene. Further, in some embodiments, the neural network algorithm may include a recurrent neural network algorithm.

The machine learning system may further determine a first network loss based on differences between the first output image and a ground truth image (730). The machine learning system may also map a second input image in the sequence of input images to a second output image based on the neural network algorithm (740). In some embodiments, the SNR of the ground truth image may be greater than the SNR of the first input image and the SNR of the second input image. In some other embodiments, the resolution of the ground truth image may be greater than the resolution of the first input image and the resolution of the second input image.

The machine learning system may further determine a second network loss based on differences between the second output image and the ground truth image (750). The machine learning system may also determine a consistency loss based on differences between the first output image and the second output image (760). In some aspects, each of the first and second output images may include a plurality of pixels values. In some embodiments, the machine learning system may determine the consistency loss based on an average pixel value associated with the plurality of pixel values of the first output image and the plurality of pixel values of the second output image. In some other embodiments, the machine learning system may determine the consistency loss by generating a matrix including the plurality of pixel values of the first output image and the plurality of pixel values of the second output image, and by determining a rank of the matrix.

The machine learning system may further update the neural network algorithm based at least in part on the first network loss, the second network loss, and the consistency loss (770). In some embodiments, the machine learning system may further determine a total loss based at least in part on the first network loss, the second network loss, and the consistency loss. The machine learning system may further minimize the total loss, and determine one or more parameters based on the minimized total loss to update the neural network algorithm.

Figure 8:
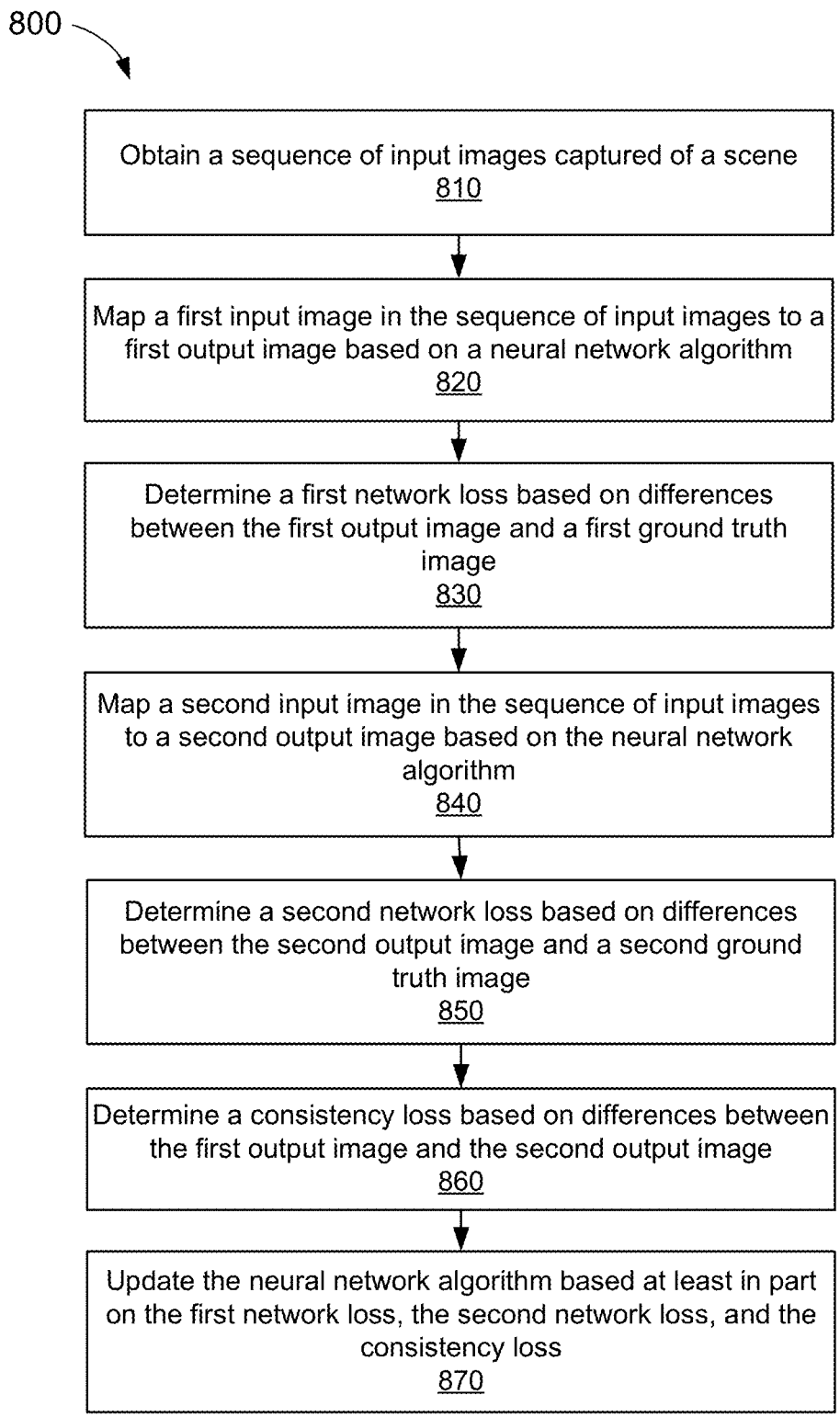
FIG. 8 shows an illustrative flowchart depicting an example operation for training neural networks, according to some implementations.

FIG. 8 shows an illustrative flowchart depicting an example operation 800 for training neural networks, according to some implementations. In some embodiments, the example operation 800 may be performed by a machine learning system (such as the machine learning system 300 and/or 600 of FIGS. 3 and 6, respectively) to train a neural network to infer denoised representations of a sequence of images.

The machine learning system may obtain a sequence of input images captured of a scene (810). The machine learning system may also map a first input image in the sequence of input images to a first output image based on a neural network algorithm (820). In some embodiments, the sequence of input images may represent images of a static and/or dynamic scene. Further, in some embodiments, the neural network algorithm may include a recurrent neural network algorithm.

The machine learning system may further determine a first network loss based on differences between the first output image and a first ground truth image (830). In some embodiments, the SNR of the first ground truth image may be greater than the SNR of the first input image. In some other embodiments, the resolution of the first ground truth image may be higher than the resolution of the first input image.

The machine learning system may also map a second input image in the sequence of input images to a second output image based on the neural network algorithm (840). The machine learning system may also determine a second network loss based on differences between the second output image and a second ground truth image (850). In some embodiments, the SNR of the second ground truth image may be greater than the SNR of the second input image. In some other embodiments, the resolution of the second ground truth image may be higher than the resolution of the second input image.

The machine learning system may also determine a consistency loss based on differences between the first output image and the second output image (860). In some aspects, each of the first and second output images may include a plurality of pixel values. In some embodiments, the machine learning system may determine the consistency loss based on an average pixel value associated with the plurality of pixel values of the first output image and the plurality of pixel values of the second output image. In some other embodiments, the machine learning system may determine the consistency loss by generating a matrix including the plurality of pixel values of the first output image and the plurality of pixel values of the second output image, and by determining a rank of the matrix.

The machine learning system may further update the neural network algorithm based at least in part on the first network loss, the second network loss, and the consistency loss (870).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of training neural networks, comprising:
obtaining a sequence of input images captured of a scene;
mapping a first input image in the sequence of input images to a first output image based on a neural network algorithm;
determining a first network loss based on differences between the first output image and a ground truth image;
mapping a second input image in the sequence of input images to a second output image based on the neural network algorithm;
determining a second network loss based on differences between the second output image and the ground truth image;
determining a consistency loss based on differences between the first output image and the second output image; and
updating the neural network algorithm based at least in part on the first network loss, the second network loss, and the consistency loss.

2. The method of claim 1, wherein each of the first output image and the second output image includes a plurality of pixel values, and wherein the consistency loss is determined based on an average pixel value associated with the plurality of pixel values of the first output image and the plurality of pixel values of the second output image.

3. The method of claim 1, wherein each of the first output image and the second output image includes a plurality of pixel values, and wherein determining the consistency loss includes generating a matrix comprising the plurality of pixel values of the first output image and the plurality of pixel values of the second output image.

4. The method of claim 3, wherein the consistency loss is determined based on a rank of the matrix.

5. The method of claim 1, wherein the ground truth image has a higher signal-to-noise ratio (SNR) than any of the first or second input images.

6. The method of claim 1, wherein the neural network algorithm comprises a recurrent neural network algorithm.

7. The method of claim 1, further comprising:
determining a total loss based at least in part on the first network loss, the second network loss, and the consistency loss.

8. The method of claim 7, further comprising:
minimizing the total loss; and
determining one or more parameters based on the minimized total loss, wherein the neural network algorithm is updated based on the one or more parameters.

9. The method of claim 1, further comprising:
mapping a third input image in the sequence of input images to a third output image based on the neural network algorithm; and
determining a third network loss based on differences between the third output image and the ground truth image, wherein the neural network algorithm is further updated based on the third network loss.

10. The method of claim 9, wherein the consistency loss is further determined based on differences between the third output image and the second output image.

11. A machine learning system comprising:
a processing system; and
a memory storing instructions that, when executed by the processing system, cause the machine learning system to:
obtain a sequence of input images captured of a scene;
map a first input image in the sequence of input images to a first output image based on a neural network algorithm;
determine a first network loss based on differences between the first output image and a ground truth image;
map a second input image in the sequence of input images to a second output image based on the neural network algorithm;
determine a second network loss based on differences between the second output image and the ground truth image;
determine a consistency loss based on differences between the first output image and the second output image; and
update the neural network algorithm based at least in part on the first network loss, the second network loss, and the consistency loss.

12. The machine learning system of claim 11, wherein each of the first output image and the second output image includes a plurality of pixel values, and wherein the consistency loss is determined based on an average pixel value associated with the plurality of pixel values of the first output image and the plurality of pixel values of the second output image.

13. The machine learning system of claim 11, wherein each of the first output image and the second output image includes a plurality of pixel values, and wherein determining the consistency loss includes generating a matrix comprising the plurality of pixel values of the first output image and the plurality of pixel values of the second output image.

14. The machine learning system of claim 13, wherein the consistency loss is determined based on a rank of the matrix.

15. The machine learning system of claim 11, wherein the ground truth image has a higher resolution than any of the first or second input images.

16. The machine learning system of claim 11, wherein the neural network algorithm comprises a recurrent neural network algorithm.

17. A method of training neural networks, comprising:
obtaining a sequence of input images captured of a scene;
mapping a first input image in the sequence of input images to a first output image based on a neural network algorithm;
determining a first network loss based on differences between the first output image and a first ground truth image;
mapping a second input image in the sequence of input images to a second output image based on the neural network algorithm;
determining a second network loss based on differences between the second output image and a second ground truth image;
determining a consistency loss based on differences between the first output image and the second output image; and
updating the neural network algorithm based at least in part on the first network loss, the second network loss, and the consistency loss.

18. The method of claim 17, wherein each of the first output image and the second output image includes a plurality of pixel values, and wherein the consistency loss is determined based on an average pixel value associated with the plurality of pixel values of the first output image and the plurality of pixel values of the second output image.

19. The method of claim 17, wherein each of the first output image and the second output image includes a plurality of pixel values, and wherein determining the consistency loss includes generating a matrix comprising the plurality of pixel values of the first output image and the plurality of pixel values of the second output image.

20. The method of claim 19, wherein the consistency loss is determined based on a rank of the matrix.

* * * * *